(12) United States Patent
Crawford et al.

(10) Patent No.: US 11,756,307 B2
(45) Date of Patent: *Sep. 12, 2023

(54) VEHICLE VIDEO SYSTEM

(71) Applicant: Apple Inc., Cupertino, CA (US)

(72) Inventors: Jared A. Crawford, Santa Clara, CA (US); Yingen Xiong, Mountain View, CA (US); Marco Pontil, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,559

(22) Filed: May 11, 2022

(65) Prior Publication Data

US 2022/0270374 A1 Aug. 25, 2022

Related U.S. Application Data

(63) Continuation of application No. 17/071,136, filed on Oct. 15, 2020, now Pat. No. 11,341,752, which is a continuation of application No. 15/712,261, filed on Sep. 22, 2017, now Pat. No. 10,810,443.

(60) Provisional application No. 62/398,125, filed on Sep. 22, 2016.

(51) Int. Cl.
G06V 20/56 (2022.01)
B60R 1/00 (2022.01)
H04N 7/18 (2006.01)
G05D 1/00 (2006.01)
B60R 11/04 (2006.01)
G05D 1/02 (2020.01)
H04N 23/63 (2023.01)

(52) U.S. Cl.
CPC ............... *G06V 20/56* (2022.01); *B60R 1/00* (2013.01); *B60R 11/04* (2013.01); *G05D 1/0038* (2013.01); *G05D 1/0246* (2013.01); *H04N 7/18* (2013.01); *H04N 7/181* (2013.01); *H04N 7/185* (2013.01); *B60R 2300/105* (2013.01); *B60R 2300/302* (2013.01); *B60R 2300/303* (2013.01); *B60R 2300/806* (2013.01); *G05D 2201/0213* (2013.01); *G06T 2207/30252* (2013.01); *H04N 23/63* (2023.01)

(58) Field of Classification Search
USPC ........................................................ 348/148
See application file for complete search history.

(56) References Cited

U.S. PATENT DOCUMENTS

| 5,961,571 A | 10/1999 | Gorr et al. |
| 6,738,314 B1 | 5/2004 | Teeter et al. |
| 7,190,259 B2 | 3/2007 | Kumata et al. |
| 8,447,136 B2 | 5/2013 | Ofek et al. |

(Continued)

FOREIGN PATENT DOCUMENTS

| CN | 101788661 A | 7/2010 |
| CN | 102679993 A | 9/2012 |

(Continued)

*Primary Examiner* — Behrooz M Senfi
(74) *Attorney, Agent, or Firm* — Young Basile Hanlon & MacFarlane, P.C.

(57) ABSTRACT

Images are obtained using cameras mounted on a vehicle, and at least a portion of the obtained images are displayed on a screen. Motion of the vehicle can be controlled such that it moves toward a physical destination selected from images obtained using cameras mounted on a vehicle.

20 Claims, 5 Drawing Sheets

(56) References Cited

U.S. PATENT DOCUMENTS

| | | |
|---|---|---|
| 8,817,067 B1 | 8/2014 | Fan et al. |
| 8,854,422 B2 | 10/2014 | Hadwiger et al. |
| 8,933,986 B2 | 1/2015 | Schall et al. |
| 8,989,700 B2 | 3/2015 | Cordero et al. |
| 9,030,524 B2 | 5/2015 | Shimizu |
| 9,055,216 B1 | 6/2015 | Taylor |
| 9,204,040 B2 | 12/2015 | Langlotz et al. |
| 9,830,713 B1 * | 11/2017 | Walker .................. H04N 23/90 |
| 10,262,537 B1 | 4/2019 | Kim et al. |
| 10,810,443 B2 * | 10/2020 | Crawford ................ H04N 7/18 |
| 11,341,752 B2 * | 5/2022 | Crawford .............. H04N 7/185 |
| 2003/0069024 A1 | 4/2003 | Kennedy |
| 2004/0100443 A1 | 5/2004 | Mandelbaum et al. |
| 2006/0187238 A1 | 8/2006 | Yoneji |
| 2008/0027591 A1 | 1/2008 | Lenser et al. |
| 2008/0043020 A1 | 2/2008 | Snow et al. |
| 2008/0044061 A1 | 2/2008 | Hongo |
| 2008/0117287 A1 | 5/2008 | Park et al. |
| 2008/0266142 A1 | 10/2008 | Sula et al. |
| 2008/0285886 A1 | 11/2008 | Allen |
| 2009/0073265 A1 | 3/2009 | Greenhill et al. |
| 2009/0240431 A1 | 9/2009 | Chau et al. |
| 2010/0017046 A1 * | 1/2010 | Cheung ................ G05D 1/0094 |
| | | 701/2 |
| 2010/0073201 A1 | 3/2010 | Holcomb et al. |
| 2011/0064312 A1 | 3/2011 | Janky et al. |
| 2011/0074916 A1 | 3/2011 | Demirdjian |
| 2011/0143707 A1 | 6/2011 | Darby, Jr. et al. |
| 2012/0229596 A1 | 9/2012 | Rose et al. |
| 2012/0253655 A1 | 10/2012 | Yamada et al. |
| 2012/0290152 A1 | 11/2012 | Cheung et al. |
| 2013/0173148 A1 | 7/2013 | Kagawa et al. |
| 2015/0022656 A1 | 1/2015 | Carr et al. |
| 2015/0078624 A1 | 3/2015 | Fukuda |
| 2015/0242702 A1 | 8/2015 | Aphek |
| 2015/0296140 A1 | 10/2015 | Kim |
| 2015/0371541 A1 | 12/2015 | Korman |
| 2016/0105610 A1 | 4/2016 | Jayaram et al. |
| 2016/0116293 A1 * | 4/2016 | Grover .................. G08G 1/005 |
| | | 701/23 |
| 2016/0191798 A1 | 6/2016 | Yoo et al. |
| 2016/0292403 A1 | 10/2016 | Gong et al. |
| 2017/0010623 A1 | 1/2017 | Tang et al. |
| 2017/0098376 A1 | 4/2017 | Wang |
| 2017/0102700 A1 | 4/2017 | Kozak |
| 2017/0178269 A1 * | 6/2017 | McKinnon ............. G06Q 50/30 |
| 2017/0235018 A1 | 8/2017 | Foster et al. |
| 2017/0277191 A1 * | 9/2017 | Fairfield ............... H04W 4/029 |
| 2017/0305345 A1 | 10/2017 | Hashimoto et al. |
| 2018/0033301 A1 | 2/2018 | Riou et al. |

FOREIGN PATENT DOCUMENTS

| | | | |
|---|---|---|---|
| CN | 104851315 A | 8/2015 | |
| CN | 105526940 A | 4/2016 | |
| CN | 105814604 A | 7/2016 | |
| EP | 2563008 A2 | 2/2013 | |
| JP | 2014102837 A * | 6/2014 | ............ G04C 3/002 |
| WO | 2015155715 A2 | 10/2015 | |

* cited by examiner

VEHICLE VIDEO SYSTEM

CROSS-REFERENCE TO RELATED APPLICATIONS

This application is a continuation of U.S. patent application Ser. No. 17/071,136, filed Oct. 15, 2020, which is a continuation of U.S. patent application Ser. No. 15/712,261, filed Sep. 22, 2017, now U.S. Pat. No. 10,810,443, which claims the benefit of U.S. Provisional Application No. 62/398,125, filed Sep. 22, 2016. The contents of the foregoing applications are incorporated herein by reference in their entirety for all purposes.

TECHNICAL FIELD

The application relates generally to processing and use of video generated by a vehicle.

BACKGROUND

Automated control systems for vehicles may navigate to a general area. For example, automated control systems may navigate to a general area as designated by a point on a map. Navigation using information such as maps is not well-suited to designating a destination at a very specific location, such as the location of an entry door to a building or a place where a person is standing.

SUMMARY

One aspect of the disclosure is a method that includes obtaining images using one or more cameras mounted on a vehicle, sending data representing at least a portion of the obtained images to a display device, receiving data representing a selected part of the obtained images, correlating the selected part of the obtained images with a geolocation, and moving the vehicle toward the geolocation.

Another aspect of the disclosure is a vehicle that includes one or more cameras mounted on the vehicle, one or more processors, and a powertrain. The one or more processors are configured to obtain images using the one or more cameras, send data representing at least a portion of the obtained images to a display device, receive data representing a selected part of the obtained images, and correlate the selected part of the obtained images with a geolocation. The powertrain is configured to move the vehicle toward the geolocation.

Another aspect of the disclosure is a non-transitory computer readable storage device having computer executable program instructions that are executable by one or more processors of a vehicle. The computer executable program instructions, when executed, cause the one or more processors to obtain images using one or more cameras mounted on the vehicle, send data representing at least a portion of the obtained images to a display device, receive data representing a selected part of the obtained images, correlate the selected part of the obtained images with a geolocation, and cause the vehicle to move toward the geolocation.

DETAILED DESCRIPTION

Figure 1:
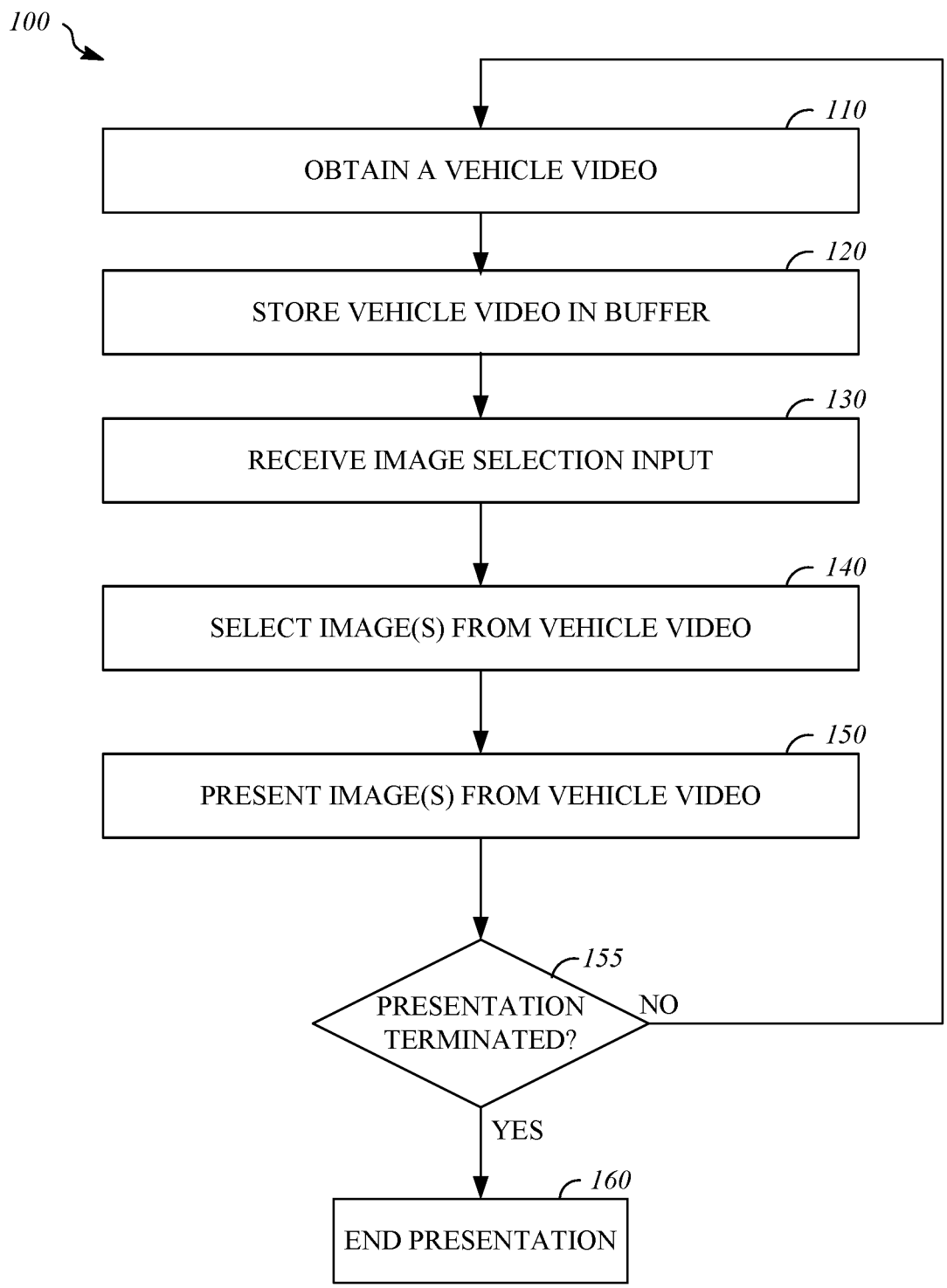
FIG. 1 is a flowchart of an exemplary process for interactively presenting images from a video generated by a vehicle.

This document describes systems and methods for obtaining, maintaining, and distributing vehicle video (i.e., a video obtained with one or more cameras mounted on a vehicle). In some implementations, a user situated in a vehicle could use this interactive interface to indicate or select a location from surroundings of the vehicle, for example, a desired drop-off location, selecting a parking spot, or indicating an object to avoid.

In some implementations, a user is enabled to remotely view or share their vehicle video. For example, a remote user may be enabled to view the surroundings of the vehicle, as if they were an occupant of the vehicle. The vehicle video may be remotely viewed or shared in a variety of ways. For example, a still panoramic image from the vehicle video may be viewed as a traditional image or in an interactive panorama viewer, allowing the viewer to look around the scene. For example, a still image showing a view from a perspective selected by a first user (e.g., the sharer) may be presented to a second user. For example, vehicle video (e.g., panoramic vehicle video) may be interactively viewed, allowing the viewer to freely look around the scene. For example, vehicle video (e.g., panoramic vehicle video) may be interactively shared, allowing the sharer to control the perspective seen by another user. For example, video, derived from vehicle video, showing a fixed view from a perspective selected by the sharer may be displayed to another user. For example, video, derived from vehicle video, showing an automatically controlled video perspective (e.g., tracking an external object) may be displayed to another user. Sharing of portions of vehicle video may be initiated by, for example, choosing to share vehicle video through a messaging app, switching to vehicle video during an in progress video conferencing call (e.g., in the same way you chose front or rear facing cameras on a smartphone), or by permanently or temporarily sharing vehicle video through a social networking interface.

For vehicles that are traveling to drop off or pick up a passenger, in particular an autonomously driving vehicle, it would be helpful for the vehicle to share its camera video with the passenger as it approaches a drop off or pick up location. Viewing portions of vehicle video may help the passenger have a better sense for where the vehicle is, understand the cause for any delays, and/or direct the vehicle to alter its current course or rendezvous location to facilitate pickup. For example, a passenger, viewing vehicle video and noticing the vehicle is approaching door 1 in the "arrivals" lane at an airport, may use the interactive interface to direct the vehicle to adjust its configured rendezvous location to a different location instead, such as door 3.

In this document, the term "video" is used to refer to a sequence of one or more images obtained by an image sensor such as a camera. Note that the one or more images in the sequence (which may also be referred to as frames) may be obtained at regular or irregular timings. For example, a video may include a sequence of images obtained regularly at 24 Hz or a video may include a sequence of one or more images obtained upon the occurrence asynchronous events (e.g., a vehicle stopping).

FIG. 1 shows exemplary process 100 for interactively presenting images from a video generated by a vehicle. A vehicle video is obtained in operation 110 from one or more cameras mounted on a vehicle. The vehicle video may be a composite video that is determined by merging images detected with multiple cameras mounted on the vehicle. For example, the cameras may be arranged in an array such that the fields of view for the cameras overlap and collectively span perspectives along an arc. In some implementations, images with overlapping fields of view from multiple cameras may be stitched together (e.g., using image stitching software) to form a composite video with a field of view spanning this arc. In some implementations, the resulting composite video is a panoramic video in the sense that the field of view of the composite video spans a 360-degree arc around the vehicle. In some implementations, the vehicle video may be obtained in operation 110 from a single camera mounted on the vehicle. For example, a vehicle video may be obtained from one or more omnidirectional cameras. In some implementations, the vehicle video may be obtained in operation 110 from one or more cameras with a wide-angle lens or a fisheye lens mounted on the vehicle. For example, images detected using a fisheye lens, or other distorting lens, may be processed to transform the image and reduce distortion effects from the lens. For example, a vehicle video may be obtained in operation 110 by an image processing unit (e.g., image processing unit 360 of FIG. 3) based on images detect by an array of cameras (e.g., camera array 350 of FIG. 3) mounted on a vehicle.

In operation 120, a vehicle video may be stored in a buffer. In some implementations, the vehicle video may be encoded in the buffer in a compressed format (e.g., MPEG-4). Frames of the vehicle video encoded in the buffer may be associated with a timestamp or an offset from a current time. For example, a data structure in the buffer storing the vehicle video may include one or more fields that specify a when a frame of the vehicle video was obtained in operation 110. In some implementations, frames of the vehicle video encoded in the buffer may be associated with a location that was occupied by the vehicle when the image(s) on which a frame was based were obtained in operation 110. In some implementations, vehicle video may be securely stored in operation 120 with associated user permissions that grant only a specific user or users access to portions of the vehicle video. For example, a vehicle video may be stored in operation 120 by an image processing unit (e.g., image processing unit 360 of FIG. 3) in a buffer implemented on a data storage apparatus (e.g., data storage apparatus 420 of FIG. 4).

Image selection input from a user may be received in operation 130. Selection input may specify a portion (e.g., one or more images) of vehicle video that is of interest to a user. In some implementations, selection input includes one or more parameters that specify a viewing angle within an available vehicle video. For example, a user viewing a portion of the vehicle video on a hand-held display device may select a viewing angle within the vehicle video by rotating the hand-held display device. By rotating the hand-held display device, the user may pan a view of the vehicle video. This rotation of the hand-held device may be detected by sensors in the device (e.g., accelerometer, gyroscope, and/or magnetometer) and converted into a viewing angle or adjustment to a viewing angle and forwarded to an image processing system (e.g., image processing unit 360 in FIG. 3) that maintains and/or distributes the vehicle video. For example, a user may select the viewing angle by tilting or turning a head of the user while the user is wearing a head-mounted display device (e.g., virtual reality goggles). By tilting or turning their head while wearing a head-mounted display device, the user may pan a view within the vehicle video. In some implementations, selection input includes gestures on a touch-screen that displays a portion (e.g., one or more images) of the vehicle video presented to a user.

For example, image selection input may be received in operation 130 from a user situated in the vehicle. In some implementations, the viewing angle for a user situated within a vehicle may be determined based on a relative orientation of a personal device of the user to a body and/or a camera array of the vehicle. The relative orientation of the personal device to the vehicle may be synchronized from time to time by the user orienting the personal device to point at a reference object or direction (e.g., point the device straight ahead in the direction of motion of the vehicle) and simultaneously indicating that the synchronization should occur (e.g., by pressing a 're-center' button on a user interface or executing a 're-center' gesture in a user interface). Between synchronization events, the relative orientation may be tracked, for example, by using sensors to track the evolution of the orientation of the vehicle and the personal device. In some implementations, a portion (e.g., one or more images) of the vehicle video, selected for presentation based on this relative orientation selection input, may depict a view from the vehicle in a direction parallel to an axis perpendicular to a display surface of the display device. This specification of the viewing angle may allow the user to seemingly look through the body of the vehicle at the area surrounding the vehicle using their personal device displaying portions of the vehicle video. A portion of the vehicle video viewed may be current (e.g., the most recent available frames) or older (e.g., from previous trip when the vehicle passed by the current location).

In some implementations, selection input may specify a time offset, for example, a time offset from the most recent frame of vehicle video. For example, a user may view a portion of the vehicle video on a personal device and the display of the personal device may overlay a scrub bar. The user may slide an icon along the scrub bar on their display to specify a time offset at which they wish to view portions of the vehicle video. Data specifying this time offset may be forwarded to an image processing system (e.g., image processing unit 360 in FIG. 3) that maintains and/or distributes portions of the vehicle video.

A user may wish to have their view track an object appearing in the vehicle video as the object and/or the vehicle continue to move relative to one another. In some implementations, an object is selected for tracking based on selection input from a user viewing portions of a vehicle video. For example, a user may select an object by tapping on the object or outlining the object in a touchscreen interface displaying portions of the vehicle video in order to identify a subset of pixels in the portion (e.g., one or more images presented) corresponding to all or part of the object. Data identifying this subset of pixels and/or the object may be forwarded to an image processing system (e.g., image processing unit 360 in FIG. 3) that maintains and/or distributes portions of the vehicle video.

A user may want to select a simple predefined view from the vehicle video. In some implementations, a pre-defined forward facing perspective within the vehicle video may selected based on the input from the user, for example, a user may tap an icon or button for 'front-cam'. In some implementations, a pre-defined rear facing perspective within the vehicle video may selected based on the input from the user, for example, a user may tap an icon or button for 'rear-cam'. Data reflecting the selection of pre-defined view may be forwarded to an image processing system (e.g., image processing unit 360 in FIG. 3) that maintains and/or distributes portions of the vehicle video.

For example, vehicle video may be shared, by a user (i.e., the sharer) with access permissions for that vehicle video, with another user (e.g., the viewer) who will view portions of the vehicle video. The sharer may want to control what portions of the vehicle video are presented to the viewer. In some implementations, a portion (e.g., one or more images) selected from the vehicle video are a portion of a still panoramic image, and the portion is determined based on a viewing angle selected by the sharer. In some implementations, a portion (e.g., one or more images) selected from the vehicle video are a video showing a view from the vehicle at a viewing angle selected based on input from the sharer. For example, selection input may be received in operation 130 in wireless communications signals from a device operated the sharer.

In some implementations, selection input may be received in operation 130, in wireless communications signals from a device operated by a user. In some implementations, the user providing selection input may be located remotely from the vehicle. For example, a remote user meeting the vehicle may check the progress of that vehicle by viewing portions of the vehicle video as the vehicle travels to a meeting place.

Figure 3:
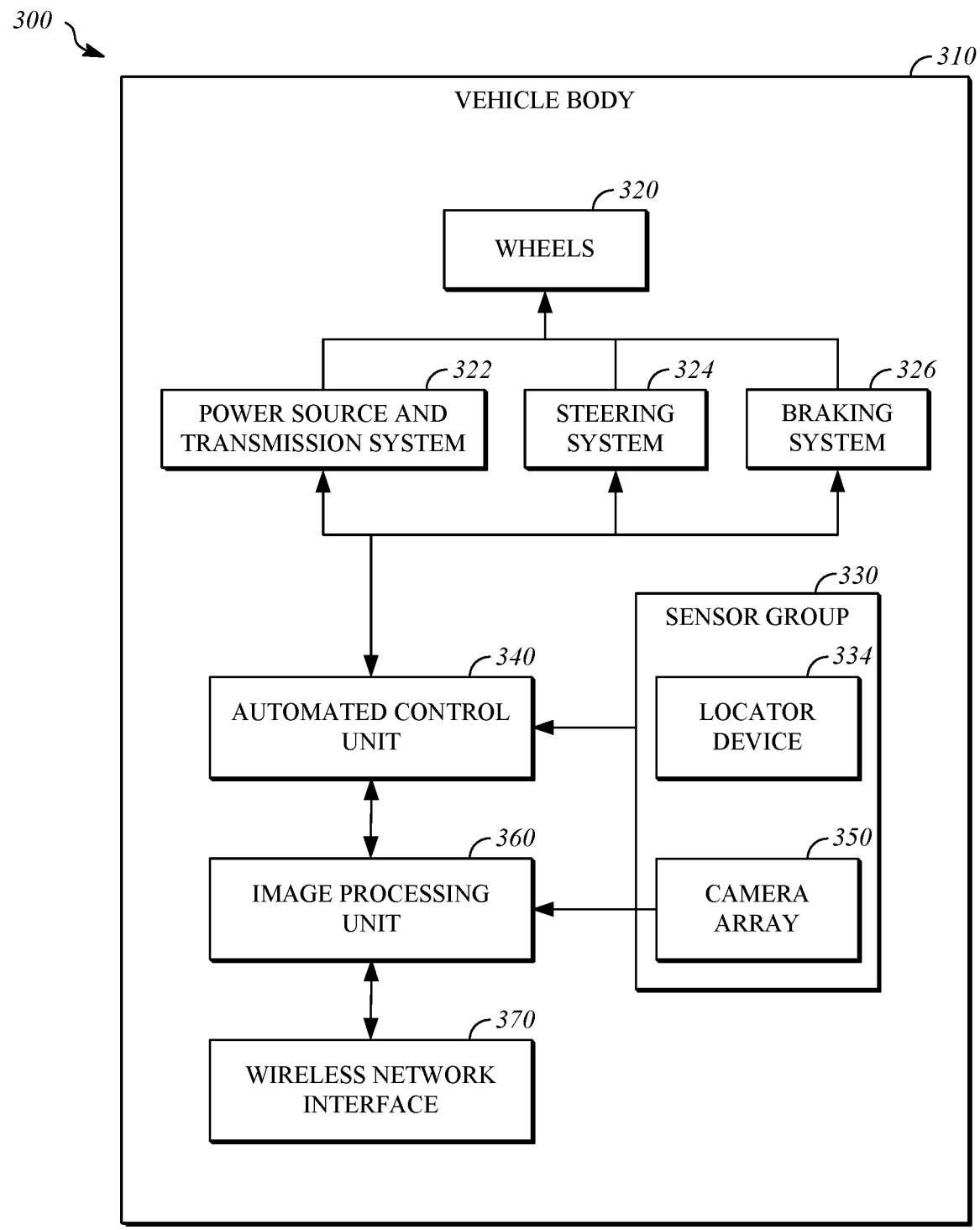
FIG. 3 is a block diagram of an exemplary vehicle.

In some implementations, selection input from a user may be received in operation 130 by an image processing unit (e.g., image processing unit 360 of FIG. 3) via a wireless interface (e.g., wireless network interface 370 of FIG. 3).

A portion (e.g., one or more images) of the vehicle video may be selected at operation 140. It may be advantageous to select a portion of the vehicle video that is suitable for display to a particular user based on, for example, their viewing interface, their interest, their access privileges, and/or instructions from a sharer. In some implementations, a portion of a vehicle video is selected at operation 140 based in part on a viewing angle specified by a user. In some implementations, a portion of a vehicle video is selected in operation 140 based in part on a time offset specified by a user. In some implementations, a portion of a vehicle video is selected in operation 140 based in part on a location specified by a user. For example, a portion (e.g., one or more images) selected from the vehicle video may be a still panoramic image. For example, a portion of the vehicle video may be selected in operation 140 by an image processing unit (e.g., image processing unit 360 of FIG. 3).

For example, a user may be interested in looking at an area to the left of the vehicle that was passed two minutes ago. Selection input to this effect may be specified by the user through the user's interface and then forwarded, in a suitable format, to an image processing unit (e.g., image processing unit 360 of FIG. 3) that maintains and/or distributes the vehicle video. The time offset of 2 minutes prior to the current or most recent frame of vehicle video may be used to identify and retrieve a relevant frame or frames from the buffer where the vehicle video is stored. The viewing angle specified in the selection input (e.g., 90 degrees left from direction of vehicle motion) may be used to pan within the relevant frame or frames to center the view in the direction of interest to the user. In some implementations, due to limitations on bandwidth of a communications link to a user device and/or limitations of the user display (e.g., a tablet or smartphone display) the field of view presented to the user may be limited (e.g., to a 120-degree field of view).

Thus, in this example scenario, a portion of the vehicle video may be selected in operation 140 as a slice of a larger (e.g., panoramic) vehicle video, where the portion has a 120-degree field of view and is centered on a direction 90 degrees left from the direction of motion of the vehicle. This portion (e.g., one or more images) of the vehicle video may include slices from one or more frames of the vehicle with timestamps near the specified time offset of 2 minutes ago. In some implementations, the portion selected in operation 140 may be a still image derived from one or more of these slices.

In some implementations, selecting a portion of the vehicle video in operation 140 includes tracking an object depicted in the vehicle video and automatically changing a perspective within the vehicle video to continue selecting images of the object for presentation to a user. For example, the object may be selected for tracking based on selection input from a user. In some implementations, data identifying a subset of pixels in a presented portion of the vehicle video, which the user has indicated corresponds to the object, is input to image recognition software to analyze the corresponding portion of the vehicle video and identify the object for tracking. In some implementations, an object (e.g., a sign, a traffic light, a vehicle, or a pedestrian) is automatically recognized and selected for tracking. For example, a portion (e.g., one or more images or additional images) selected in operation 140 from the vehicle video may be a video showing a view depicting an object that is automatically tracked as the vehicle moves in relation to the object.

In some implementations, a portion of the vehicle video selected in operation 140 may be restricted to include only portions for which user has access privileges. For example, where two users share a vehicle, vehicle video may be stored in operation 120 securely and privately within the buffer and, by default, a particular user may be granted access to only portions of vehicle video obtained during the particular user's operation of the shared vehicle.

A selected portion (e.g., one or more images) of the vehicle video may be presented to a user in operation 150. In some implementations, the portion of the vehicle video is presented in operation 150 by transmitting (e.g., via wireless network interface 370 of FIG. 3) image data representing the portion of the vehicle video to a personal device (e.g., a tablet, a smartphone, a head-mounted display) of a user that is configured to display the portion. In some implementations, a personal device of the user may be configured to allow the user to store images from the portion of the vehicle video displayed. For example, a personal device of the user may be configured to display the portion of the vehicle video in an interface that includes a 'photo snap' button or icon, which, when pressed, causes the personal device to store an image from the portion of vehicle video displayed in a digital photo format. This image may be stored on the user's personal device and/or signals may be transmitted to the vehicle, causing the image to be stored in a storage apparatus in the vehicle, for example, as a file associated with the user.

In some implementations, a personal device of the user may be configured to allow the user to store a video excerpt from the portion of the vehicle video displayed. For example, a personal device of the user may be configured to display the portion of the vehicle video in an interface includes a 'record' button or icon, which, when pressed, causes the personal device to store one or more frames from the portion of vehicle video displayed in a digital video format. This video excerpt may be stored on the user's personal device and/or signals may be transmitted to the vehicle, causing the video excerpt to be stored in a storage apparatus in the vehicle, for example, as a file associated with the user.

In some implementations, the vehicle video may be displayed on a user device in an interface that resembles a traditional smartphone camera application interface. For example, the interface may include icons or button for causing a displayed portion of vehicle video to be stored (e.g., as a still photo file or as a video file). For example, the interface may allow a user to digitally zoom in or zoom out on a displayed portion of vehicle video, for example, by performing zoom gesture (e.g., a pinch-to-zoom gesture on a touch screen).

For example, the selected portion (e.g., one or more images) of the vehicle video may be presented in operation 140 to a user that is situated in an emergency response vehicle to facilitate response to emergencies, for example, car accidents or fire. Vehicle video from vehicles near the scene of an accident during or after the occurrence of the accident may be shared with emergency response users for this purpose. This may help emergency response users to respond to an emergency, for example, by previewing the scene of an accident as the emergency vehicle approaches the scene.

In some implementations, the selected portion of the vehicle video may be presented in operation 140 by displaying the portion on a display mounted in the vehicle. For example, the display may be connected via a wired or wireless link to an image processing unit in the vehicle (e.g., image processing unit 360 of FIG. 3) that maintains and/or distributes the vehicle video.

A vehicle video presentation session may be terminated in operation 160 by the user or another event or command (e.g., the vehicle shutting down or a command from another user (e.g., a sharer) who controls access to the vehicle video) processed by an image processing unit of the vehicle. If, at operation 155, the vehicle video presentation session is not terminated, an image processing unit may continue receiving additional selection input from a user in operation 130 and/or presenting additional portions of the vehicle video to a user in operation 150.

Figure 2:
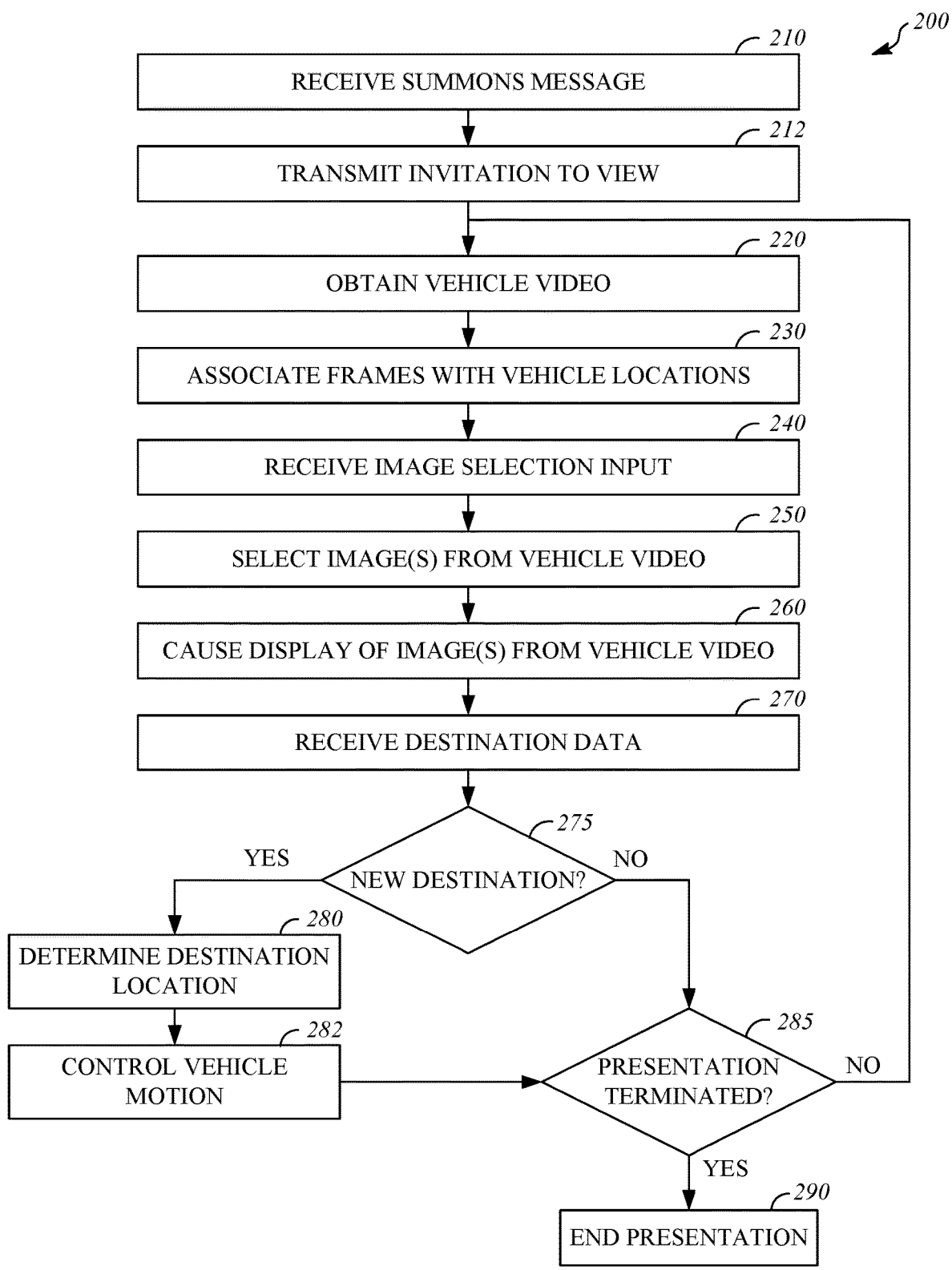
FIG. 2 is a flowchart of an exemplary process for adjusting a rendezvous location to facilitate pick-up by a vehicle.

FIG. 2 shows an exemplary process 200 for adjusting a rendezvous location to facilitate pick-up by a vehicle. A summons message may be received in operation 210. A summons message may originate from a display device of a user that wishes to be picked up by a vehicle. For example, a summons message may be formatted by an intermediary (e.g., a ride sharing service) in response to a message received from a display device of a user. A summons message may specify a rendezvous location, where the pick-up will occur. In some implementations, a summons message may specify a user to be picked up and/or a personal device of the user. For example, a summons message may be received in operation 210 by a vehicle (e.g., vehicle 300 of FIG. 3) via a wireless interface (e.g., wireless network interface 370 of FIG. 3).

In response to a summons message received in operation 210, a vehicle may transmit an invitation to view the image data in operation 212 based on vehicle video to a display device that originated or is identified in the summons message. The invitation to view may facilitate the establishment of a vehicle video presentation session with the display device of the user. For example, the invitation to view may include a link that may be selected by a user to initiate a vehicle video presentation session with the vehicle. For example, an invitation to view image data based on vehicle video may be transmitted in operation 212 by a vehicle (e.g., vehicle 300 of FIG. 3) via a wireless interface (e.g., wireless network interface 370 of FIG. 3).

In operation 220, the vehicle may continue or commence obtaining vehicle video from one or more cameras mounted on a vehicle. The vehicle video may be a composite video that is determined by merging images detected with multiple cameras mounted on the vehicle. For example, the cameras may be arranged in an array such that the fields of view for the cameras overlap and collectively span perspectives along an arc. In some implementations, images with overlapping fields of view from multiple cameras may be stitched together (e.g., using image stitching software) to form a composite video with a field of view spanning this arc. In some implementations, the resulting composite video is a panoramic video in the sense that the field of view of the composite video spans a 360-degree arc around the vehicle. In some implementations, the vehicle video may be obtained in operation 220 from a single camera mounted on the vehicle. For example, a vehicle video may be obtained from one or more omnidirectional cameras. In some implementations, the vehicle video may be obtained in operation 220 from one or more cameras with a wide-angle lens or a fisheye lens mounted on the vehicle. For example, images detected using a fisheye lens, or other distorting lens, may be processed to transform the image and reduce distortion effects from the lens. For example, a vehicle video may be obtained in operation 220 by an image processing unit (e.g., image processing unit 360 of FIG. 3) based on images detect by an array of cameras (e.g., camera array 350 of FIG. 3) mounted on a vehicle.

Frames of the vehicle video may be associated with a location of the vehicle in operation 230. A location of the vehicle may be determined at a time when a frame of the vehicle video is obtained in operation 220. This determined location may be associated with this frame of vehicle video in operation 230. In some implementations, a location is associated with a frame of vehicle video in operation 230 by creating a record that includes data encoding the location and includes data encoding the frame or a pointer to data encoding the frame of vehicle video. In some implementations, a location is associated with a frame of vehicle video in operation 230 by creating a record including data encoding the frame and including a pointer to data encoding the location.

In some implementations, a location is stored as coordinates specifying a position. In some implementations, location information may be quantized into bins associated with particular landmarks, street addresses, roads, buildings, or other objects represented in map data. For example, a range of coordinates along a road passing in front of a building with a street address may be mapped to an identifier for that street address.

In some implementations, vehicle orientation information (e.g., a heading for the vehicle) may be determined (e.g., using a GPS receiver, a gyroscope, and/or and accelerometer) and associated with one or more frames of the vehicle video.

Image selection input from a user may be received in operation 240. In some implementations, selection input may be received in operation 240, in wireless communications signals from a device operated by a user. Selection input may specify a portion (e.g., one or more images) of vehicle video that is of interest to a user. In some implementations, the user providing selection input may be located remotely from the vehicle. For example, image selection input may be received in operation 240 from the display device of the user that will be picked up. The user to be picked up by the vehicle may check the progress of that vehicle by viewing portions of the vehicle video as the vehicle travels to the rendezvous location.

In some implementations, selection input includes one or more parameters that specify a viewing angle within an available vehicle video. For example, a user viewing a portion of the vehicle video on a hand-held display device may select a viewing angle within the vehicle video by rotating the hand-held display device. By rotating the hand-held display device, the user may pan a view of the vehicle video. This rotation of the hand-held device may be detected by sensors in the device (e.g., accelerometer, gyroscope, and/or magnetometer) and converted into a viewing angle or adjustment to a viewing angle and forwarded to an image processing system (e.g., image processing unit 360 in FIG. 3) that maintains and/or distributes the vehicle video. For example, a user may select the viewing angle by tilting or turning a head of the user while the user is wearing a head-mounted display device (e.g., virtual reality goggles). By tilting or turning their head while wearing a head-mounted display device, the user may pan a view within the vehicle video. In some implementations, selection input includes gestures on a touch-screen that displays a portion (e.g., one or more images) of the vehicle video presented to a user.

In some implementations, selection input may specify a time offset, for example, a time offset from the most recent frame of vehicle video. For example, a user may view a portion of the vehicle video on a personal device and the display of the personal device may overlay a scrub bar. The user may slide an icon along the scrub bar on their display to specify a time offset at which they wish to view portions of the vehicle video. Data specifying this time offset may be forwarded to an image processing system (e.g., image processing unit 360 in FIG. 3) that maintains and/or distributes portions of the vehicle video.

A user may wish to have their view track an object appearing in the vehicle video as the object and/or the vehicle continue to move relative to one another. In some implementations, an object is selected for tracking based on selection input from a user viewing portions of a vehicle video. For example, a user may select an object by tapping on the object or outlining the object in a touchscreen interface displaying portions of the vehicle video in order to identify a subset of pixels in the portion (e.g., one or more images presented) corresponding to all or part of the object. Data identifying this subset of pixels and/or the object may be forwarded to an image processing system (e.g., image processing unit 360 in FIG. 3) that maintains and/or distributes portions of the vehicle video.

A user may want to select a simple predefined view from the vehicle video. In some implementations, a pre-defined forward facing perspective within the vehicle video may selected based on the input from the user, for example, a user may tap an icon or button for 'front-cam'. In some implementations, a pre-defined rear facing perspective within the vehicle video may selected based on the input from the user, for example, a user may tap an icon or button for 'rear-cam'. Data reflecting the selection of pre-defined view may be forwarded to an image processing system (e.g., image processing unit 360 in FIG. 3) that maintains and/or distributes portions of the vehicle video.

For example, vehicle video may be shared, by a user (i.e., the sharer) with access permissions for that vehicle video, with another user (e.g., the viewer) who will view portions of the vehicle video. The sharer may want to control what portions of the vehicle video are presented to the viewer. In some implementations, a portion (e.g., one or more images) selected from the vehicle video are a portion of a still panoramic image, and the portion is determined based on a viewing angle selected by the sharer. In some implementations, a portion (e.g., one or more images) selected from the vehicle video are a video showing a view from the vehicle at a viewing angle selected based on input from the sharer. For example, selection input may be received in operation 240 in wireless communications signals from a device operated the sharer.

In some implementations, selection input from a user may be received in operation 240 by an image processing unit (e.g., image processing unit 360 of FIG. 3) via a wireless interface (e.g., wireless network interface 370 of FIG. 3).

A portion (e.g., one or more images) of the vehicle video may be selected in operation 250. For example, a portion of the vehicle video may be selected in operation 250 based on selection input from the user that will be picked up. The user may be enabled to interactively view the surroundings of vehicle as it approaches the rendezvous location, to check the progress of the vehicle and to find landmarks that might facilitate pick-up.

In some implementations, a portion of a vehicle video is selected in operation 250 based in part on a viewing angle specified by a user. In some implementations, a portion of a vehicle video is selected in operation 250 based in part on a time offset specified by a user. In some implementations, a portion of a vehicle video is selected in operation 250 based in part on a location specified by a user. For example, a portion (e.g., one or more images) selected from the vehicle video may be a still panoramic image. For example, a portion of the vehicle video may be selected in operation 250 by an image processing unit (e.g., image processing unit 360 of FIG. 3).

In some implementations, selecting a portion of the vehicle video at operation 250 includes tracking an object depicted in the vehicle video and automatically changing a perspective within the vehicle video to continue selecting images of the object for presentation to a user. For example, the object may be selected for tracking based on selection input from a user. In some implementations, data identifying a subset of pixels in a presented portion of the vehicle video, which the user has indicated corresponds to the object, is input to image recognition software to analyze the corresponding portion of the vehicle video and identify the object for tracking. In some implementations, an object (e.g., a sign, a traffic light, a vehicle, or a pedestrian) is automatically recognized and selected for tracking. For example, a portion (e.g., one or more images) selected in operation 250 from the vehicle video may be a video showing a view depicting an object that is automatically tracked as the vehicle moves in relation to the object.

In some implementations, a portion of the vehicle video selected in operation 250 may be restricted to include only portions for which user has access privileges.

A display, on a screen, of a portion (e.g., one or more images) selected in operation 250 from the vehicle video may be caused in operation 260. For example, an image processing unit (e.g., image processing unit 360 of FIG. 3) may cause display, on a screen of the display device of the user that will be picked up, of images of the surroundings of the vehicle as it approaches the rendezvous location. For example, the image processing unit (e.g., image processing unit 360 of FIG. 3) may cause the display by transmitting image data based on the portion (e.g., one or more images) selected in operation 250 from the vehicle video to the display device of the user that will be picked up. The user may be enabled to interactively view the surroundings of vehicle as it approaches the rendezvous location, to check the progress of the vehicle and to find landmarks that might facilitate pick-up.

In some implementations, the display is caused in operation 260 by transmitting (e.g., via wireless network interface 370 of FIG. 3) image data representing the portion of the vehicle video to a personal device (e.g., a tablet, a smartphone, a head-mounted display) of a user (e.g., the user that will be picked up) that is configured to display the portion. For example, the display may be caused by sending data representing at least a portion of the obtained vehicle video to a device external to the vehicle. In some implementations, a personal device of the user may be configured to allow the user to store images from the portion of the vehicle video displayed. For example, a personal device of the user may be configured to display the portion of the vehicle video in an interface that includes a 'photo snap' button or icon, which, when pressed, causes the personal device to store an image from the portion of vehicle video displayed in a digital photo format. This image may be stored on the user's personal device and/or signals may be transmitted to the vehicle, causing the image to be stored in a storage apparatus in the vehicle, for example, as a file associated with the user.

In some implementations, a personal device (e.g., the display device of the user that will be picked up) of the user may be configured to allow the user to store a video excerpt from the portion of the vehicle video displayed. For example, a personal device of the user may be configured to display the portion of the vehicle video in an interface includes a 'record' button or icon, which, when pressed, causes the personal device to store one or more frames from the portion of vehicle video displayed in a digital video format. This video excerpt may be stored on the user's personal device and/or signals may be transmitted to the vehicle, causing the video excerpt to be stored in a storage apparatus in the vehicle, for example, as a file associated with the user.

In some implementations, the vehicle video may be displayed on a user device (e.g., the display device of the user that will be picked up) in an interface that resembles a traditional smartphone camera application interface. For example, the interface may include icons or button for causing a displayed portion of vehicle video to be stored (e.g., as a still photo file or as a video file). For example, the interface may allow a user to digitally zoom in or zoom out on a displayed portion of vehicle video, for example, by performing zoom gesture (e.g., a pinch-to-zoom gesture on a touch screen).

Destination data may be received in operation 270. The destination data may reflect a user's intended adjustment to a rendezvous location, for example, the destination data may indicate a location for the vehicle to approach for pick up. In some implementations, the destination data may identify an image of an object, which is at or near a desired rendezvous location that appears in the vehicle video. The destination data may represent user selection of a part of the displayed portion of the obtained vehicle video. For example, the destination data may identify a subset of pixels from the image data that have been selected by a user (e.g., the user that will be picked up).

For example, the destination data may be received in operation 270 by an image processing unit (e.g., image processing unit 360 of FIG. 3) via a wireless interface (e.g., wireless network interface 370 of FIG. 3). The destination data may be received in operation 270 from an external device (e.g., a smartphone, a tablet, or head-mounted display) that is outside of the vehicle. For example, the destination data may be received in operation 270 from the display device of the user that will be picked up.

In some implementations, a selected part of the displayed portion of the obtained vehicle video may be associated with an object depicted in the obtained vehicle video. For example, a subset of pixels selected by a user may be associated with an object (e.g., a sign, a vehicle, a sidewalk, or a crosswalk, a person) depicted in the vehicle video. In some implementations, a user may select an object by tapping on the object or outlining the object in a touchscreen interface displaying portions of the vehicle video in order to identify a subset of pixels in the portion (e.g., one or more images presented) corresponding to some or all of the object. Data identifying this subset of pixels and/or the object may be forwarded to an image processing system (e.g., image processing unit 360 in FIG. 3) that maintains and/or distributes the vehicle video.

In operation 275, If the destination data received in operation 270 includes new destination data, then a destination location is determined in operation 280 based on the destination data. The destination location may be near the user's location where the user prefers to have the vehicle to arrive for pick up. For example, a user who is exiting a restaurant may prefer to be picked up a few steps away from the front door of the restaurant. In some implementations, determining the destination location in operation 280 includes correlating a user selected part of the vehicle video, which is represented by the destination data, with a geolocation. This geolocation may be referred to as a physical destination for the vehicle. In some instances, correlating the selected part with the physical destination includes determining a location of an object shown in the user selected part. In some implementations, determining the location of the object includes comparing at least two parts of the obtained vehicle video from two or more cameras mounted on the vehicle to estimate a distance from a vehicle location, where the at least two parts of the obtained images were obtained, to the object.

In some implementations, determining the destination location in operation 280 includes determining a location of an object shown in a subset of pixels in the vehicle video that are identified by the destination data. Pixels in the vehicle video may be naturally associated with a direction or angle relative to the vehicle (e.g., relative to an associated heading of the vehicle) and the location of the vehicle may also be associated with the frame(s) of the vehicle video that the pixels were based on. For example, stereoscopic computer vision techniques may be employed to estimate a distance from the vehicle location to the object depicted in the subset of pixels identified. An intended rendezvous location may be determined based on this information. In some implementations, determining the location of the object comprises comparing images, on which the frame was based, from two or more of the cameras mounted on the vehicle to estimate a distance from the location of the vehicle associated with the frame to the object.

In some implementations, the destination location may be determined as a location near (e.g., adjacent to) the vehicle in the same direction as the indicated rendezvous location. The vehicle may proceed to travel in that direction slowly, regularly updating the destination location based on tracking the indicated object within its vehicle video (e.g., within additional images), until the vehicle is stopped by an obstruction (e.g., another car, a curb, or the user who will be picked up).

In an example scenario, the user that will be picked up may select pixels in their display interface that depict a sign (e.g., an airport vestibule sign) near their intended rendezvous location. The destination data received from the user's display device may identify that subset of pixels within the portion of vehicle video that was displayed to the user. The location of the sign may be determined in part by determining a direction of the sign from the vehicle's location that is associated with the frame(s) on which the displayed portion of the vehicle video were based.

In some implementations, determining the destination location in operation 280 may include determining the destination location to be an allowed vehicle location that is closest to the location of the object. In some cases, the apparent intended rendezvous location is not an allowed location for a vehicle. For example, the user may select a subset of pixels depict the user standing on a sidewalk waiting for the vehicle. The vehicle is not allowed to move onto the sidewalk. A properly configured navigation system may prevent the vehicle from moving to that location. In some implementations, a vehicle may determine the destination location to be the same as the indicated rendezvous location (e.g., the location of the user standing on the sidewalk in the current example) in operation 250. The vehicle may take the shortest path to the indicated rendezvous location until it is stopped by its navigation system (e.g., stopped at a curb). However, in some cases, the shortest path to the indicated rendezvous location will not terminate at the closest allowed location to the rendezvous location. For example, at an airport with multiple lanes divided by medians, the shortest path may stop in the wrong lane, which may be far from the rendezvous location. Reaching the closest allowed location may involve circling the vehicle around to enter the closest lane. In some implementations, detailed road map information of the area may be compared to an indicated rendezvous location to find the closest allowed vehicle location. This closest allowed vehicle location may then be determined in operation 280 as the destination location for the vehicle. For example, vehicle navigation techniques may then be used to determine a route from the current location of the vehicle to the closest allowed vehicle location.

Motion of the vehicle may be controlled in operation 282. For example, a destination location may be passed to a vehicle control unit (e.g., automated control unit 340 of FIG. 3), which may control the vehicle motion to move toward the destination location. The destination location may correspond to a physical location. In some implementations, a vehicle control unit (e.g., automated control unit 340 of FIG. 3) in the vehicle controls the vehicle in operation 282 by issuing control signals to a power source and transmission system, a steering system, and/or a braking system of the vehicle in order to cause the vehicle to move toward the destination location. In some implementations, a destination location may be updated (e.g., periodically) as the vehicle moves toward the indicated rendezvous location. In some implementations, the vehicle may continue moving toward a destination location until it reaches the destination location or until it is stopped by an obstacle (e.g., a curb, another car, a person) blocking its path. For example, when the vehicle stops at or near the destination location, the user may enter the vehicle to complete the pick-up. Thus, the process 200 can, in some implementations, include receiving data representing a destination for the vehicle, and moving the vehicle toward the destination, wherein obtaining the images using the one or more cameras mounted on the vehicle comprises obtaining the images when the vehicle is within a threshold distance of the destination.

A vehicle video presentation session may be terminated in operation 290 by the user or another event or command (e.g., the vehicle shutting down or a command from another user (e.g., a sharer) who controls access to the vehicle video) processed by an image processing unit of the vehicle. If, in operation 285, the vehicle video presentation session is not terminated, an image processing unit may continue receiving additional selection input from a user in operation 240, causing display of additional portions of the vehicle video to a user in operation 260, and/or receiving new destination data in operation 270.

The process 100, the process 200, and other systems and methods disclosed herein involve transmission and/or storage of personal information such as images, videos, and location information. Users can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions of portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

FIG. 3 shows an exemplary vehicle 300 configured for maintaining and distributing vehicle video. The vehicle 300 includes a vehicle body 310 that contains or is attached to the other systems and components of the vehicle 300. The vehicle 300 includes wheels 320 that are capable of serving as an interface between the vehicle and a road. The wheels provide control surfaces that may be used to guide the vehicle along paths on a road. The vehicle 300 also includes a power source and transmission system 322, including, for example, a power source that is connected to the wheels 320 of the vehicle 300 by a transmission. As examples, the power source and transmission system 322 may include a combustion engine or an electric motor that is powered by a battery. The power source and transmission system 322 is capable of causing rotation of the wheels 320 to accelerate the vehicle along a road or other surface. The power source and transmission system 322 may be referred to herein as a powertrain. The vehicle 300 also includes a steering system 324 capable of turning the wheels 320 in relation to the vehicle body 310 to direct the motion of the vehicle 300, e.g., by controlling the yaw angle and angular velocity or path curvature of the vehicle. The vehicle 300 includes a sensor group 330, configured to detect the state of the vehicle and its surroundings. The vehicle 300 also includes an automated control unit 340 that is configured to receive data from an image processing unit 360, the sensor group 330, and possibly other sources (e.g., a vehicle passenger/operator control interface) and process the data to implement automated control of the motion of the vehicle 300 by sending control signals to the power source and transmission system 322, the steering system 324, and the braking system 326 that are actuated by these systems via the wheels 320.

The sensor group 330 may include a locator device 334 that is configured to determine a current location of the vehicle. For example, locator device 334 may include a GPS receiver and/or other sensors (e.g., odometer, accelerometer, gyroscope) that can be used to facilitate make fine adjustments to an estimate of the current location. In some implementations, locator device 334 may output a vehicle location expressed in coordinates (e.g., longitude, latitude, elevation). In some implementations, locator device 334 may be used to determine orientation information for the vehicle, for example, it may determine a heading for vehicle 300. For example, a precision gyroscope (e.g., a fiber optic gyroscope) may be used to track small changes in heading.

The sensor group 330 includes a camera array 350. The camera array 350 may include one or more cameras arranged in a fixed orientation with respect to each other in order to span a desired field of view for the vehicle. In some implementations, cameras in camera array 350 may be arranged so that their respective fields of view overlap, to facilitate stitching of images from the cameras into composite images of the surroundings. In some implementations, the field of view for camera array 350 spans a 360-degree arc around the vehicle (i.e., about a vertical axis when the vehicle is resting on its wheels on flat ground). For example, camera array 350 may include four cameras, each with a 120-degree field of view, arranged so that one faces forward, one faces left, one faces right, and one faces the behind the vehicle. In some implementations, one or more of the cameras in camera array 350 are omnidirectional cameras. In some implementations, one or more of the cameras in camera array 350 have a wide-angle lens. In some implementations, one or more of the cameras in camera array 350 have a fisheye lens.

Image processing unit 360 may obtain images from camera array 350 at a desired frame rate (e.g., 24 Hz). For example, image processing unit 360 may process the images using computer vision techniques to detect changes in the surroundings of the vehicle (e.g., detect other vehicles and obstacles) and generate models of the surroundings and/or alerts that can be passed to automated control unit 340 to facilitate safe maneuvering of the vehicle. Images obtained from camera array 350 may also be encoded as vehicle video and stored in a video buffer 362. In some implementations, frames of the vehicle video may be associated with a time, a heading, and/or a location when and/or where the images on which that frame is based was obtained.

Vehicle video may be accessed by a user situated in the vehicle or by a user at a remote location. In some implementations, a portion of the vehicle video is presented to a user by transmitting data encoding the portion to a display device of the user via wireless network interface 370. For example, wireless network interface 370 may be configured to transmit and receive signals according to a wireless networking standard (e.g., Wi-Fi or WiMAX). For example, the image processing unit 360 may be configured to implement process 100 as described in relation to FIG. 1. For example, the image processing unit 360 may be configured to implement process 200 as described in relation to FIG. 2. The image processing unit 360 may include specialized image processing hardware and/or software running on a data processing apparatus with additional capabilities.

The various units described with respect to FIG. 3 and elsewhere in this document, such as the automated control unit 340 and the image processing unit 360, can be computing units. Computing units can be any kind of computing device that is operable to generate an output in response to an input according to instructions. Examples of structures that can be utilized to implement computing units includes processors with memory devices, field programmable gate arrays, and application-specific integrated circuits. Instructions can be provided in the form of, for example, executable computer program code that causes the respective unit to perform the functions that are described herein.

Figure 4:
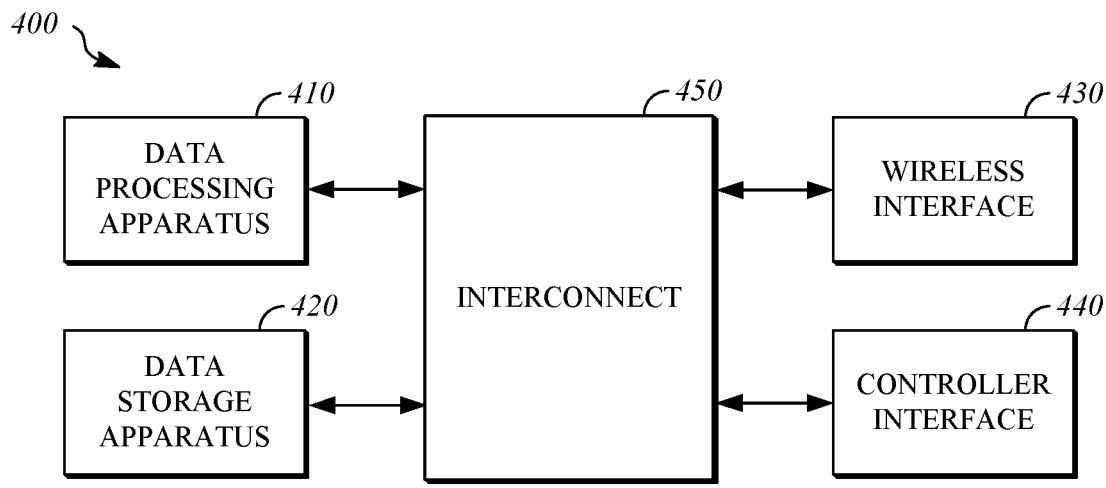
FIG. 4 is a block diagram of an exemplary hardware configuration for a vehicle controller.

FIG. 4 shows an exemplary hardware configuration for a vehicle controller 400 configured to maneuver a vehicle and provide additional services including the maintenance and distribution of vehicle video. The hardware configuration may include a data processing apparatus 410, a data storage apparatus 420, a wireless interface 430, a controller interface 440, and an interconnect 450 through which the data processing apparatus 410 may access the other components. The data processing apparatus 410 is operable to execute instructions that have been stored in a data storage apparatus 420. In some implementations, the data processing apparatus 410 is a processor with random access memory for temporarily storing instructions read from the data storage apparatus 420 while the instructions are being executed. For example, the data storage apparatus 420 may be a non-volatile information storage device such as a hard drive or a solid-state drive. The wireless interface 430 facilitates communication with other devices, for example, a personal device of a user. For example, wireless interface 430 may facilitate communication via a vehicle Wi-Fi network with a tablet device held by a passenger in the vehicle. For example, wireless interface 430 may facilitate communication via a WiMAX network with a smartphone device held by a user at an external location. The controller interface 440 allows input and output of information to other systems within a vehicle to facilitate automated control of the vehicle. For example, the controller interface 440 may include serial ports (e.g., RS-232 or USB) used to issue control signals to actuators in the vehicle and to receive sensor data from a sensor group. For example, the interconnect 450 may be a system bus, or a wired or wireless network.

Figure 5:
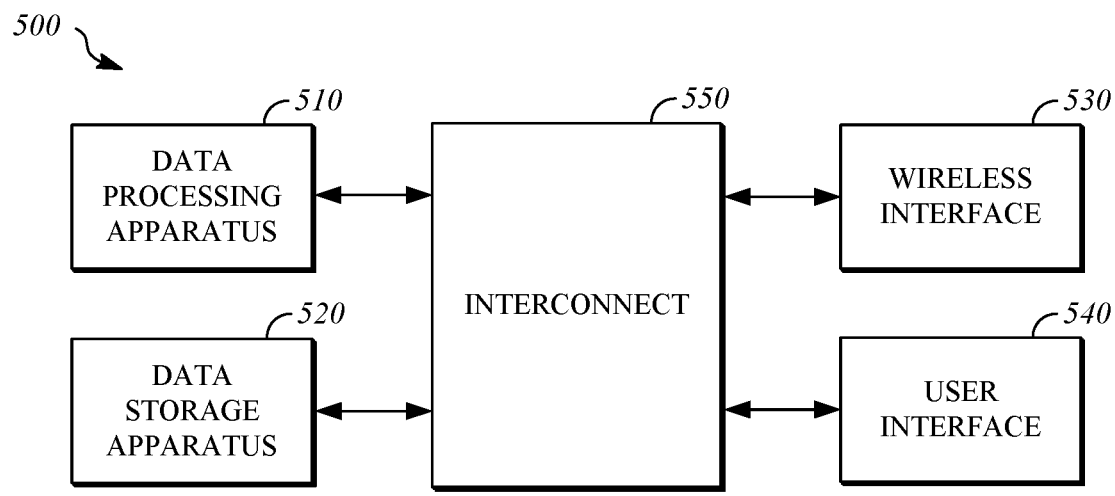
FIG. 5 is a block diagram of an exemplary hardware configuration for a display device.

FIG. 5 shows an exemplary hardware configuration for a display device 500 configured to interactively display vehicle video obtained from a vehicle; determine, based on vehicle video and user input, destination data, which may be used to direct motion of the vehicle, and transmit destination data to the vehicle. The hardware configuration may include a data processing apparatus 510, a data storage apparatus 520, a wireless interface 530, a user interface 540, and an interconnect 550 through which the data processing apparatus 510 may access the other components. The data processing apparatus 510 is operable to execute instructions that have been stored in a data storage apparatus 520. In some implementations, the data processing apparatus 510 is a processor with random access memory for temporarily storing instructions read from the data storage apparatus 520 while the instructions are being executed. For example, the data storage apparatus 520 may be a non-volatile information storage device such as a hard drive or a solid-state drive. The wireless interface 530 facilitates communication with other devices, for example, a vehicle. For example, wireless interface 530 may facilitate communication via a vehicle Wi-Fi network with a vehicle controller. For example, wireless interface 530 may facilitate communication via a WiMAX network with vehicle at a remote location. The user interface 540 allows input and output of information from/to a user. For example, the user interface 540 may include a touchscreen. For example, the user interface 540 may include a head-mounted display (e.g., virtual reality goggles or augmented reality glasses). For example, the user interface 540 may include sensors (e.g., an accelerometer, a gyroscope, and/or a magnetometer) for detecting motion of the display device. For example, the interconnect 550 may be a system bus, or a wired or wireless network.

In implementing techniques exemplified by the systems and processes described in relation to FIGS. 1-4, it may be desirable to use more network bandwidth and processing time and power on the display device in order to reduce latency in the interactive viewing of vehicle video by a user. In some implementations, vehicle video may be obtained (e.g., from a vehicle via wireless interface 530) by display device 500 in a more complete format and more of the processing of the vehicle video data for the interactive display may be performed locally by the display device. For example, complete vehicle video may be streamed to a display device and an image processing unit, similar to image processing unit 360 of FIG. 3, may be implemented (e.g., as software executed by data processing apparatus 510) on display device 500. This image processing unit may select portions of the vehicle video for presentation to the user via user interface 540 based user selection input received via user interface 540. Performing these image processing operations locally may reduce latency for interactive viewing of the vehicle video (e.g., panning to see different subsets of a field of view available in the vehicle video).

Figure 6:
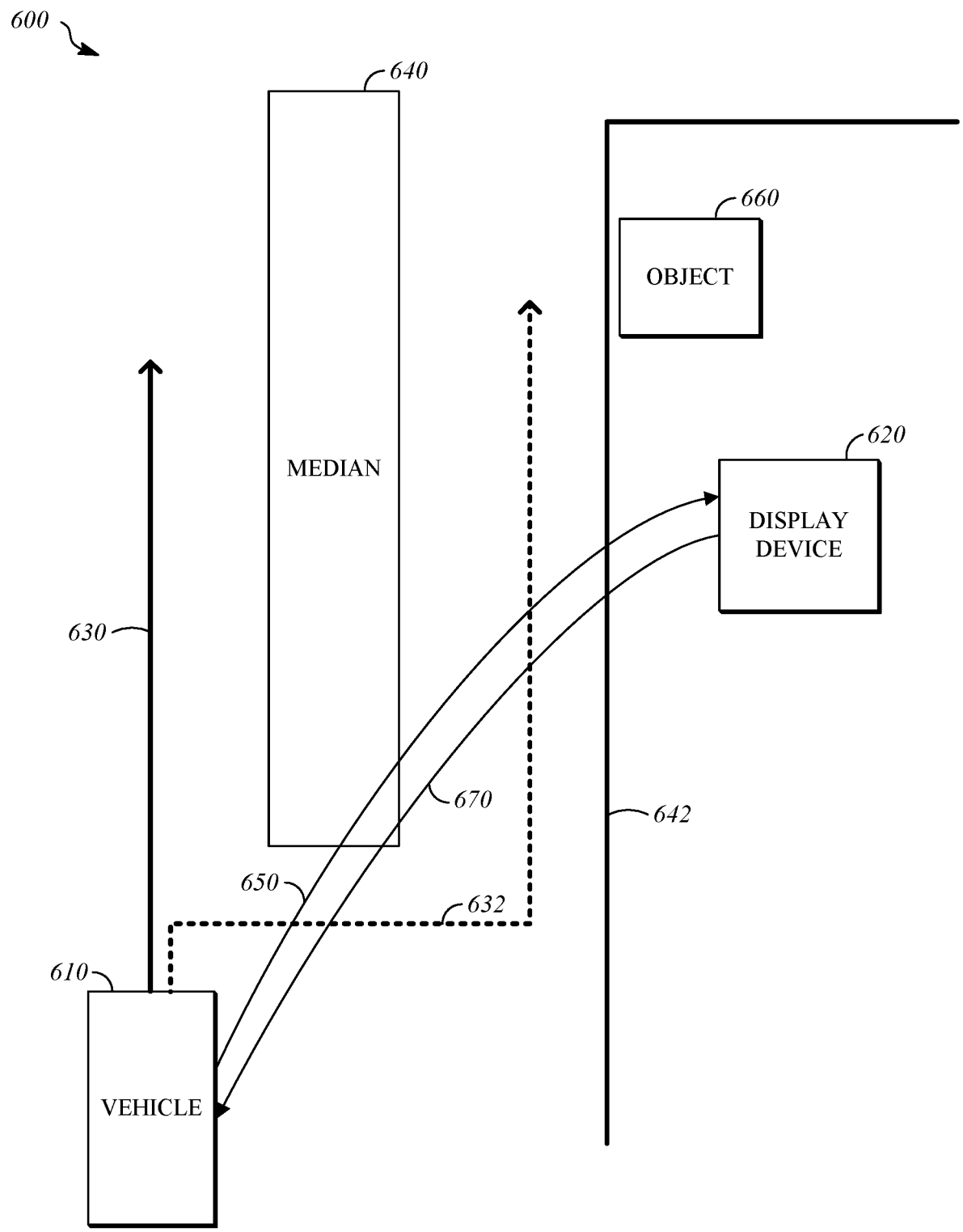
FIG. 6 is an illustration of an exemplary vehicle pick-up scenario.

FIG. 6 illustrates an exemplary vehicle pick-up scenario 600. A vehicle 610 is travelling to pick-up a user of display device 620. A summons message may have originated from display device 620 and been received by vehicle 610 to initiate the pick-up operation. The summons message may have specified a rendezvous location (e.g., as an address of an airport terminal), but the specification may apply to a large and crowded area. Vehicle 610 commences a vehicle video presentation session with display device 620 and travels to the airport for the pick-up along route 630 based on the provided location information. However, route 632 terminates on the far side of median 640 from the user, who is collocated with display device 620, waiting on a sidewalk beyond a curb 642. This default rendezvous location may be inconvenient or unsafe for the user.

As it travels, vehicle 610 is presenting vehicle video 650 to the user via display device 620. The user views the vehicle video 650 on display device 620 to track the progress of vehicle 610. The user notices from views of the vehicle's surroundings that vehicle 610 is traveling in the wrong lane for pick-up. In response, the user may input command(s) through the user interface on the display device 620 to select a depiction of an object 660 (e.g., a sign) that is nearby in the vehicle video viewed on display device 620 to indicate that the object is near an intended new rendezvous location. Destination data 670 is determined based on the user's selection of a part of the vehicle video corresponding to the object 660. The destination data 670 may be transmitted from the display device 620 to the vehicle 610. Based in part on the destination data 670, vehicle is able to determine a new destination location near the object 660 and plot a new course for the route 632 to the new destination in the proper lane. Vehicle 610 may then be maneuvered to the new destination and complete the pick-up of the user.

Another aspect of the disclosure is a vehicle that includes an array of cameras mounted on the vehicle, a wireless network interface, an image processing unit, and an automated control unit. The image processing unit is configured to determine a first video based on images detected with the array of cameras, associate frames of the first video with locations of the vehicle, and transmit, via the wireless network interface, image data based on the first video to a display device that is configured to display the image data. The image processing unit is further configured to receive, via the wireless network interface, destination data from the display device, in which the destination data identifies a subset of pixels from the image data that have been selected, and determine a destination location based at least in part on the destination data and a location of the vehicle associated with a frame from which the subset of pixels was derived. The automated control unit is configured to control the vehicle such that the vehicle occupies the destination location.

In some implementations, the array of cameras is mounted such that all angles, about an axis perpendicular a surface over which the vehicle is traveling, appear within fields of view of at least two cameras in the array of cameras.

In some implementations, determining the destination location comprises determining a location of an object shown in the subset of pixels and determining the destination location to be an allowed vehicle location that is closest to the location of the object. In some implementations, determining the location of the object comprises comparing images, on which the frame was based, from two or more cameras in the array of cameras to estimate a distance from the location of the vehicle associated with the frame to the object. In some implementations, the subset of pixels is associated with an object depicted in the first video.

In some implementations, the display device is located outside of the vehicle.

In some implementations, the vehicle is configured to receive, via the wireless network interface, a summons message originating from the display device, and responsive to the summons message, transmit, via the wireless network interface, an invitation to view the image data based on the first video to the display device.

Another aspect of the disclosure is a method includes obtaining a first video based on images detected with one or more cameras mounted on a vehicle, and presenting one or more images selected from the first video to a first user. In some implementations of the method, the one or more images presented to the first user are selected based on input from the first user. The first user may be situated in the vehicle. The input from the first user may indicate an orientation of a display device viewed by the first user, and the orientation of the display device may be determined by determining a relative orientation of the display device, relative to the one or more cameras mounted on the vehicle, and selecting the one or more images presented based on the relative orientation, where the one or more images presented depict a view from the vehicle in a direction parallel to an axis perpendicular to a display surface of the display device.

In some implementations, the input from the first user includes rotating a hand-held display device to pan a view within the first video. In some implementations, the input from the first user comprises tilting or turning a head of the first user while the first user is wearing a head-mounted display device to pan a view within the first video. In some implementations, the input from the first user includes gestures on a touch-screen that displays the one or more images presented to the first user. A pre-defined forward facing perspective within the first video is may be selected based on the input from the first user. A pre-defined rear facing perspective within the first video may be selected based on the input from the first user.

In some implementations, presenting the one or more images includes transmitting image data representing the one or more images to a personal device associated with the first user.

In some implementations, the method includes tracking an object depicted in the first video and automatically changing a perspective within the first video to continue selecting images of the object for presentation to the first user. The object may be automatically recognized and selected for tracking. The object may be selected for tracking based on input from the first user.

In some implementations, first user selects, from the one or more images presented, a parking space depicted in the first video. The method may also include automatically parking the vehicle in the parking space.

In some implementations, the first user selects, from the one or more images presented, a drop-off location depicted in the first video. The method may also include automatically controlling the vehicle such that the vehicle occupies the drop-off location.

In some implementations, the first user is situated at a remote location relative to the vehicle. In some implementations, the first user is situated in an emergency response vehicle.

The one or more images selected from the first video may be a still panoramic image. The one or more images selected from the first video may be a portion of a still panoramic image, where the portion is determined based on a viewing angle selected by a second user. The one or more images selected from the first video may be a video showing a view from the vehicle at a viewing angle selected based on input from the first user. The one or more images selected from the first video may be a video showing a view from the vehicle at a viewing angle selected based on input from a second user. The one or more images selected from the first video may be a video showing a view depicting an object that is automatically tracked as vehicle moves in relation to the object.

What is claimed is:

1. A method, comprising:
receiving a summons message indicative of a user wishing to be picked up by a vehicle;
sending an image to a display device that is remote from the vehicle based on the summons message, wherein a viewing angle at which the image is presented by the display device is based on an orientation of the display device;
receiving data representing a user selection of a portion of the image from the display device;
determining a destination for the vehicle to approach based on road map information associated with the user selection; and
causing the vehicle to move toward the destination.

2. The method of claim 1, wherein the viewing angle at which the image is presented by the display device is modified based on rotation of the display device.

3. The method of claim 1, further comprising:
obtaining the image and additional images using one or more cameras mounted on the vehicle.

4. The method of claim 3, wherein the user selection includes an object within the image, and wherein the destination location is an allowed vehicle location that is closest to a location of the object based on the road map information.

5. The method of claim 4, wherein the object is present in at least some of the additional images.

6. The method of claim 5, further comprising:
sending at least some of the additional images that include the object to the display device.

7. The method of claim 5, wherein determining the destination includes tracking the object within the additional images.

8. A passenger vehicle, comprising:
one or more cameras mounted on the passenger vehicle; and
one or more processors configured to:
obtain images using the one or more cameras,
send a portion of the images to a display device;
receive data representing a user selection of an object within the portion from the display device;
determine a destination for the passenger vehicle to approach based on a location of the object, wherein the destination is an allowed vehicle location that is closest to the location of the object based on road map information; and
cause the passenger vehicle to move toward the destination.

9. The passenger vehicle of claim 8, wherein the display device is remote from the passenger vehicle.

10. The passenger vehicle of claim 9, wherein the one or more processors are further configured to:
receive a summons message indicative of a user wishing to be picked up by the passenger vehicle.

11. The passenger vehicle of claim 10, wherein sending the portion of the images is based on the summons message.

12. The passenger vehicle of claim 8, wherein the one or more processors are further configured to:
update the destination based on tracking the object within the images.

13. The passenger vehicle of claim 8, wherein a viewing angle at which the portion of the image is presented by the display device based on an orientation of the display device.

14. A non-transitory computer readable storage device having computer executable program instructions that are executable by one or more processors of a vehicle, wherein the computer executable program instructions, when executed, cause the one or more processors to:
receive a summons message indicative of a location where a user wishes to be picked up by the vehicle;
obtain an image of the location using one or more cameras mounted on the vehicle;
send the image to a display device based on the summons message;
receive data representing a user selection of a portion of the image from the display device;
determine a destination for the vehicle to approach based on road map information associated with the location and based on the user selection; and
cause the vehicle to move toward the destination.

15. The non-transitory computer readable storage device of claim 14, wherein the display device is remote from the vehicle.

16. The non-transitory computer readable storage device of claim 15, wherein a viewing angle at which the image is presented by the display device is based on an orientation of the display device.

17. The non-transitory computer readable storage device of claim 15, wherein the user selection of the portion is based on a gesture on a touch screen of the display device that displays the portion.

18. The non-transitory computer readable storage device of claim 14, wherein the portion of the image is an object within the image.

19. The non-transitory computer readable storage device of claim 18, wherein the computer executable program instructions further cause the one or more processors of the vehicle to update the destination based on tracking the object within additional images obtained using the one or more cameras mounted on the vehicle.

20. The non-transitory computer readable storage device of claim 19, wherein the computer executable program instructions further cause the one or more processors of the vehicle to send at least some of the additional images that include the object to the display device.

* * * * *

UNITED STATES PATENT AND TRADEMARK OFFICE
CERTIFICATE OF CORRECTION

PATENT NO. : 11,756,307 B2
APPLICATION NO. : 17/741559
DATED : September 12, 2023
INVENTOR(S) : Jared A. Crawford, Yingen Xiong and Marco Pontil It is certified that error appears in the above-identified patent and that said Letters Patent is hereby corrected as shown below:

In the Claims

At Column 20, Claim number 13, Line number 43, "device based on" should be --device is based on--.

Signed and Sealed this
Thirty-first Day of October, 2023

Katherine Kelly Vidal
*Director of the United States Patent and Trademark Office*